United States Patent [19]
Ohuchi et al.

[11] Patent Number: 5,112,581
[45] Date of Patent: May 12, 1992

[54] METHOD OF SEPARATING URANIUM AND PLUTONIUM FROM MIXED SOLUTION CONTAINING URANIUM AND PLUTONIUM

[75] Inventors: Jin Ohuchi; Isao Kondoh, both of Naka; Takashi Okada, Katsuta, all of Japan

[73] Assignee: Doryokuro Kakunenryo Kaihatsu Jigyodan, Tokyo, Japan

[21] Appl. No.: 738,545

[22] Filed: Jul. 31, 1991

[30] Foreign Application Priority Data

Oct. 1, 1990 [JP] Japan ................... 2-263379

[51] Int. Cl.$^5$ .......................................... G01G 56/00
[52] U.S. Cl. .......................................... 423/3; 423/11; 423/251; 423/253; 423/254; 252/627
[58] Field of Search ............ 423/3, 11, 251, 253, 423/254; 252/627

[56] References Cited

U.S. PATENT DOCUMENTS

| 2,871,251 | 1/1959 | Gofman et al. | 534/13 |
|---|---|---|---|
| 2,952,511 | 9/1960 | Maddock et al. | 423/6 |
| 3,195,977 | 7/1965 | Matheson | 423/12 |
| 3,294,493 | 12/1966 | Jonke et al. | 423/4 |
| 3,821,091 | 6/1974 | Bilal et al. | 204/1.5 |
| 3,949,048 | 4/1976 | Holt, Jr. | 423/8 |
| 4,981,616 | 1/1991 | Ohtsuka et al. | 252/632 |

FOREIGN PATENT DOCUMENTS 1316690 12/1989 Japan .
1316695 12/1989 Japan .

OTHER PUBLICATIONS

Preliminary Report, 1990 Fall Meeting of the Atomic Energy Society of Japan, published on Sep. 10, 1990.
Bruce, F. R. et al, "Progress in Nuclear Energy, Process Chemistry" vol. 2, 1958, pp. 544-545.
Cleveland, J. M., "The Chemistry of Plutonium", 1970, pp. 433-436.

Primary Examiner—Brooks H. Hunt
Assistant Examiner—Ngoclan T. Mai
Attorney, Agent, or Firm—Wenderoth, Lind & Ponack

[57] ABSTRACT

A method of separating uranium and plutonium from a mixed solution containing uranium nitrate and plutonium nitrate comprises cooling the mixed solution to a temperature ranging from −40° to −20° C. to thereby selectively precipitate uranyl nitrate. The precipitated uranyl nitrate is separated from the solution while leaving plutonium nitrate to remain in the solution.

3 Claims, 1 Drawing Sheet

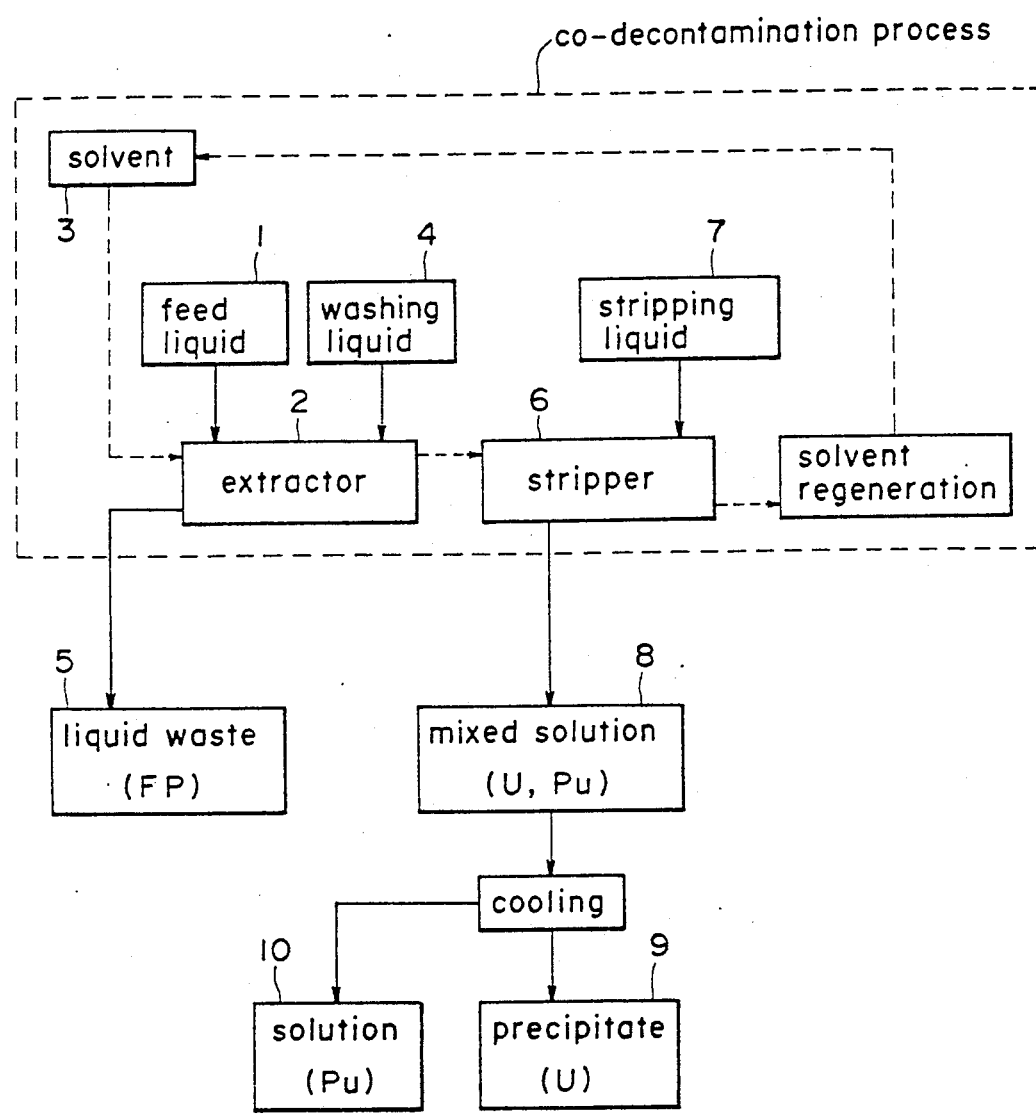

METHOD OF SEPARATING URANIUM AND PLUTONIUM FROM MIXED SOLUTION CONTAINING URANIUM AND PLUTONIUM

BACKGROUND OF THE INVENTION

The present invention relates to a method of separating uranyl nitrate and plutonium nitrate from a mixed nitric acid solution containing uranyl nitrate and plutonium nitrate.

In particular, the separating method of the present invention can replace a partition process (a process in which uranium and plutonium contained in an extractant are separated from each other by the use of a difference in the distribution ratio therebetween) which has hitherto been carried out in the reprocessing of spent nuclear fuel.

In the reprocessing of spent nuclear fuel, uranium (U) and plutonium (Pu) are separated from each other by means of the partition process. That is, a nitric acid solution containing U, Pu and FP (fission products) is contacted with an organic solvent, such as tributyl phosphate (TBP)/n-dodecane, to thereby extract U and Pu in an organic phase (co-decontamination process). Subsequently, the organic solvent containing U and Pu is brought into contact with a nitric acid solution containing a reducing agent (such as uranous nitrate) to reduce $Pu^{4+}$ into $Pu^{3+}$ to be stripped or back extracted into a water phase while leaving $UO_2^{2+}$ to remain in the organic phase (partition process). The U left remaining in the organic phase is later stripped with dilute nitric acid.

As described above, the partition process in which U and Pu are separated from each other utilizes the difference therebetween in the distribution ratio with respect to an extractant. However, the employed operations, such as extraction and stripping, are complicated, the amount of an extractant to be used is large, and the addition of a reducing agent is required.

SUMMARY OF THE INVENTION

An object of the present invention is to provide a novel method of separating U and Pu from a mixed solution containing U and Pu in which the amount of an extractant to be used is advantageously reduced and neither the additon of a reducing agent nor the complicated extraction/stripping operations are required.

According to the present invention, there is provided a method of separating uranium and plutonium from a mixed solution containing uranium and plutonium comprising cooling a mixed solution containing uranyl nitrate and plutonium nitrate to a temperature ranging from −40 to −20° C. to thereby selectively precipitate uranyl nitrate and separating the precipitated uranyl nitrate from the solution while leaving plutonium nitrate in the solution.

The separation of U and Pu according to the present invention takes advantage of not a difference in the distribution ratio with respect to a solvent therebetween but a difference in the solubility in a nitric acid solution therebetween. That is, plutonium nitrate has a high solubility in nitric acid at a temperature as low as −40 to −20° C. On the other hand, uranyl nitrate has such a low solubility that it crystallizes and precipitates. Accordingly, by cooling a mixed solution containing uranyl nitrate and plutonium nitrate to such a low temperature, uranyl nitrate can be separated as a crystal and plutonium nitrate as a solution.

BRIEF DESCRIPTION OF THE DRAWING

The accompanying drawing is a flow chart showing a preferred embodiment of the present invention.

PREFERRED EMBODIMENTS OF THE INVENTION

Referring to the accompanying drawing, there is shown an example in which the separation process of U and Pu according to the present invention is carried out subsequent to the co-decontamination process in the reprocessing of spent nuclear fuel.

A feed liquid 1 containing U, Pu and FP which comprises a nitric acid solution of spent fuel is introduced into an extractor 2, such as a pulse column, in which the feed liquid is contacted with a 30% TBP organic solvent 3 to thereby extract U and Pu in an organic phase while leaving FP to remain in an aqueous phase. A minute amount of FP incorporated in the organic phase is decontaminated with a washing liquid 4. The aqueous phase and washing liquid containing FP are removed as a liquid waste 5.

The resulting organic phase containing U and Pu sufficiently freed from the FP components is subsequently introduced into a stripper 6, in which it is brought into contact with a stripping liquid 7 comprising a diluted nitric acid solution to thereby extract U and Pu from the organic phase, thus forming a mixed solution 8 containing uranyl nitrate and plutonium nitrate. The used organic solvent 3 is regenerated by a low-temperature distillation method or the like for recycling.

The mixed solution 8 containing uranyl nitrate and plutonium nitrate thus obtained is cooled to a temperature ranging from −40 to −20° C. and allowed to stand still according to the present invention. As a result, uranyl nitrate precipitates as a crystal, while plutonium nitrate is concentrated and left remaining in the solution. By separating the precipitate from the solution by means of filtration or decantation, uranyl nitrate precipitate 9 can be separated from a plutonium nitrate solution 10.

The separated uranyl nitrate precipitate 9 is dissolved, according to necessity, while controlling the acid concentration with nitric acid, and recooled to effect recrystallization for the purpose of increasing the purity. By repeating this sequence of dissolving and crystallizing operations many times, high-purity uranyl nitrate crystals can be obtained. Direct denitration of the uranyl nitrate crystals by microwave heating gives uranium trioxide $UO_3$.

The experimental results of the method of the present invention will now be described. Cooling a mixed solution of 3 M in nitric acid concentration containing plutonium nitrate and uranyl nitrate to −40° C. and allowing it to stand still for 2 hours caused precipitation of yellow uranyl nitrate crystals. The Pu and U concentrations of the untreated solution before cooling and the supernatant after cooling and standing are as indicated in the following Table.

|  | Experiment 1 | | Experiment 2 | |
| --- | --- | --- | --- | --- |
|  | Pu concn. (g/l) | U concn. (g/l) | Pu concn. (g/l) | U concn. (g/l) |
| untreated | 118 | 135 | 9.3 | 200 |

-continued

|  | Experiment 1 | | Experiment 2 | |
| --- | --- | --- | --- | --- |
|  | Pu concn. (g/l) | U concn. (g/l) | Pu concn. (g/l) | U concn. (g/l) |
| solution supernatant | 139 | 72 | 9.5 | 164 |
| U separation* |  | 46(%) |  | 18(%) |

Note:

*U separation (%) = $100 - \dfrac{\text{U concentration of supernatant}}{\text{U concentration of untreated liquid}} \times 100$ The above experimental results prove that it is possible to selectively precipitate uranyl nitrate from a mixed solution containing uranyl nitrate and plutonium nitrate and to separate uranyl nitrate from the plutonium nitrate solution.

In the above-described method of separating U and Pu according to the present invention, it is not necessary to use an organic solvent and a reducing agent and to perform complicated operations, such as extraction and stripping, differing from the conventional partition process employed in the reprocessing of spent nuclear fuel. Therefore, the use of the method of the present invention as the partition process subsequent to the co-decontamination process in the reprocessing of spent nuclear fuel leads to a reduction in the amount of the solvent to be used in the fuel reprocessing process as a whole.

Moreover, the separating method of the present invention is performed at low temperatures, so that it is free from the danger of fire and explosion to thereby attain safety improvement, and further there is an advantage that the corrosion of apparatus material by a nitric acid solution can be suppressed.

What is claimed is

1. A method of separating uranium and plutonium from a mixed solution containing uranium and plutonium, said method comprising cooling a mixed solution containing uranyl nitrate and plutonium nitrate to a temperature ranging from $-40$ to $-20°$ C. to thereby selectively precipitate uranyl nitrate and separating the precipitated uranyl nitrate from the solution while leaving plutonium nitrate to remain in the solution.

2. The method according to claim 1, wherein said mixed solution is a nitric acid solution containing uranyl nitrate and plutonium nitrate obtained by contacting a nitric acid solution of spent nuclear fuel with an organic solvent to extract uranyl nitrate and plutonium nitrate in an organic phase, stripping the resulting organic phase with a stripping liquid of a nitric acid solution to strip uranyl nitrate and plutonium nitrate from said organic phase.

3. The method according to claim 1, which further comprises dissolving said separated uranyl nitrate precipitate in a nitric acid and cooling the resulting solution to effect recrystallization of uranyl nitrate.

* * * * *